United States Patent
Himmelmann et al.

(10) Patent No.: US 7,385,332 B2
(45) Date of Patent: Jun. 10, 2008

(54) PERMANENT MAGNET DYNAMOELECTRIC MACHINE WITH AXIALLY DISPLACEABLE PERMANENT MAGNET ROTOR ASSEMBLY

(75) Inventors: Richard A. Himmelmann, Beloit, WI (US); Mohammad Shahamat, Rockton, IL (US); David G. Halsey, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 112 days.

(21) Appl. No.: 11/405,743

(22) Filed: Apr. 17, 2006

(65) Prior Publication Data

US 2007/0241628 A1 Oct. 18, 2007

(51) Int. Cl.
*H02K 21/00* (2006.01)
(52) U.S. Cl. .................. 310/190; 310/191; 310/209
(58) Field of Classification Search ............... 310/190, 310/191, 209; *H02K 21/00*
See application file for complete search history.

(56) References Cited

U.S. PATENT DOCUMENTS

| | | | | |
|---|---|---|---|---|
| 1,194,645 A | * | 8/1916 | Lincoln | 310/209 |
| 2,025,187 A | * | 12/1935 | Werner et al. | 184/6.16 |
| 4,920,295 A | * | 4/1990 | Holden et al. | 310/209 |
| 5,627,419 A | * | 5/1997 | Miller | 310/74 |
| 6,404,097 B1 | * | 6/2002 | Pullen | 310/268 |
| 6,492,753 B2 | | 12/2002 | Zepp et al. | |
| 6,555,941 B1 | * | 4/2003 | Zepp et al. | 310/191 |
| 6,943,478 B2 | | 9/2005 | Zepp et al. | |
| 7,042,128 B2 | * | 5/2006 | Zepp et al. | 310/191 |
| 7,190,101 B2 | * | 3/2007 | Hirzel | 310/268 |

* cited by examiner

*Primary Examiner*—Darren Schuberg
*Assistant Examiner*—Naishadh N Desai
(74) *Attorney, Agent, or Firm*—Stephen G. Mican

(57) ABSTRACT

A dynamoelectric machine comprises: a stator that comprises a plurality of stator poles arranged around a stator surface of revolution with a stator axis for the stator surface of revolution; at least one rotor that comprises a plurality of permanent rotor magnets arranged around a rotor surface of revolution with a rotor axis for the rotor surface of revolution that is coincident with the stator axis and with the rotor surface of revolution adjacent the stator surface of revolution; a drive shaft with a drive shaft axis of rotation that is substantially coincident with the stator axis coupled to the rotor for rotating the rotor relative to the stator about the drive shaft axis of rotation; and a at least one actuator for axially displacing the rotor surface of revolution along the drive shaft relative to the stator surface of revolution to change magnetic flux interaction between the stator poles and the rotor magnets; wherein at least one of the surfaces of revolution tilts with respect to the drive shaft axis of rotation.

36 Claims, 11 Drawing Sheets

PERMANENT MAGNET DYNAMOELECTRIC MACHINE WITH AXIALLY DISPLACEABLE PERMANENT MAGNET ROTOR ASSEMBLY

FIELD OF THE INVENTION

The invention relates to dynamoelectric machines of the permanent magnet type, and more particularly to a permanent magnet dynamoelectric machine that has adjustable magnetic flux interaction between its rotor and its stator.

BACKGROUND OF THE INVENTION

Dynamoelectric machines of the permanent magnet type have a rotor assembly comprising a plurality of permanent rotor magnets arranged radially around a drive shaft that rotate with the drive shaft about a stator assembly that comprises a plurality of stator poles and a stator winding. The rotor magnets have a fixed axial alignment that generally coincides with the axial position of the stator poles. The rotor magnets have a fixed radial alignment that is inside the radial position of the stator poles for machines of the conventional type or outside the radial position of the stator poles for machines of the "inside out" type.

Since the rotor magnets have a fixed radial and axial alignment with respect to the stator poles, when used as a generator the electrical potential that the dynamoelectric machine generates is primarily proportional to the rotational speed of the rotor assembly and the power consumed by an electrical load. As a generator, a primary problem with this class of machines is that there is no convenient way to regulate the generated electrical potential that may vary with rotational speed and load variations, unlike dynamoelectric machines with a rotor winding that may control rotor winding current from an exciter for regulation.

Similarly, when used as a motor driven by source of electric power, the back electromotive force (EMF) that the dynamoelectric machine generates subtracts from the electrical potential of the power source. The power source must supply increasing electrical potential for increasing speed at constant torque. Eventually, the power source cannot supply additional potential and then the output torque of the dynamoelectric machine falls with increasing speed until no further torque is achievable. As a motor, a primary problem with this class of machines is that there is no convenient way to regulate the generated back EMF that increases with rotational speed, unlike dynamoelectric machines with a rotor winding that may control rotor winding current from an exciter to reduce back EMF at high speeds and thereby achieve high speed output torque.

Consequently, dynamoelectric machines of the permanent magnet type used as a generator may produce a lower electrical potential than required when operated at a slower rotational speed than a desired operational speed and produce too much potential when operated at a faster rotational speed than the desired operational speed. Such variations in potential can cause hazardous conditions or damage to electrical components that comprise the electrical load. Dynamoelectric machines of the permanent magnet type used as a motor have poor torque characteristics at high speeds when they have a design that requires high torque at low speeds.

Various schemes are used to electrically or mechanically compensate for the limitations of this class of machine in the generator and motor modes of operation. However, to date they all add significant weight, cost and complexity to the dynamoelectric machine or its control system.

SUMMARY OF THE INVENTION

The invention comprises a dynamoelectric machine that comprises: a stator that comprises a plurality of stator poles arranged around a stator surface of revolution with a stator axis for the stator surface of rotation; at least one rotor that comprises a plurality of permanent rotor magnets arranged around a rotor surface of revolution with a rotor axis for the rotor surface of revolution that is substantially coincident with the stator axis and with the rotor surface of revolution adjacent the stator surface of revolution; a drive shaft with a drive shaft axis of rotation that is substantially coincident with the stator axis coupled to the rotor for rotating the rotor relative to the stator about the rotor axis; and at least one actuator for axially displacing the rotor surface of revolution along the drive shaft relative to the stator surface of revolution to change magnetic flux interaction between the stator poles and the rotor magnets; wherein at least one of the surfaces of revolution tilts with respect to the drive shaft axis of rotation.

DETAILED DESCRIPTION OF THE INVENTION

Figure 1:
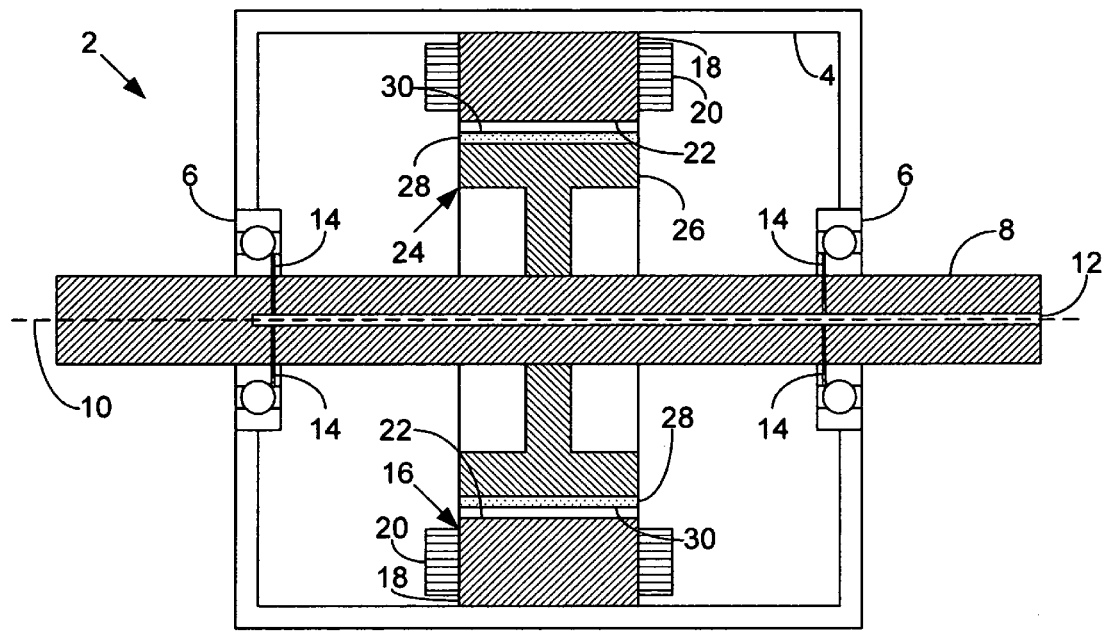
FIG. 1 is a cut-away side view of a permanent magnet type dynamoelectric machine of the conventional type according to the prior art.

FIG. 1 is a cut-away side view of a permanent magnet type dynamoelectric machine 2 of the conventional type according to the prior art. The dynamoelectric machine 2 comprises a housing 4 that mounts at least one bearing assembly 6 for supporting a drive shaft 8 that has a drive shaft axis of rotation 10. Two bearing assemblies 6 support the drive shaft 8 in FIG. 1. For high power applications, the drive shaft 8 may have a drive shaft lubrication oil channel 12 that extends from one end of the drive shaft 8 down along the drive shaft axis 10 for receiving lubrication oil and distributing it to each bearing assembly 6 by way of bearing lubrication channels 14 that couple to the drive shaft lubrication oil channel 12.

The dynamoelectric machine 2 also comprises a stator assembly 16 mounted to the housing 4 that comprises a plurality of stator poles 18. Each stator pole 18 has an associated stator pole winding 20. The stator poles 18 have pole faces 22 arranged in a generally cylindrical pattern facing radially inward toward the drive shaft axis of rotation 10. The dynamoelectric machine 2 further comprises a rotor assembly 24 mounted to the drive shaft 8 adjacent and in general alignment with the stator assembly 16. The rotor assembly 24 comprises a rotor hub 26 that mounts a plurality of permanent rotor magnets 28. The rotor magnets 28 have magnet faces 30 arranged in a generally cylindrical pattern facing radially outward from the drive shaft axis of rotation 10 toward the stator poles 18. In this configuration, the rotor magnets 28 revolve within the stator poles 18.

Figure 2:
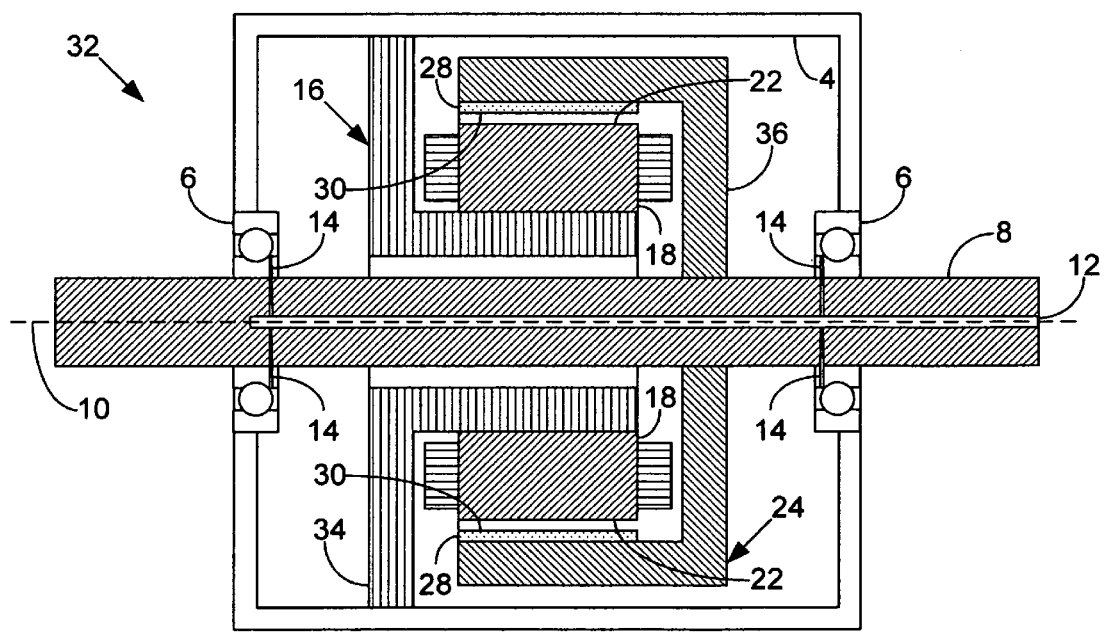
FIG. 2 is a cut-away side view of a permanent magnet type dynamoelectric machine of the "inside out" type according to the prior art.

FIG. 2 is a cut-away side view of a permanent magnet type dynamoelectric machine 32 of the "inside out" type according to the prior art. In this case, the stator assembly 16 comprises a stator hub 34 that mounts the pole faces 22 of the stator poles 18 in a generally cylindrical pattern facing radially outward from the drive shaft axis of rotation 10 and the rotor assembly 24 comprises a rotor hub 36 that mounts the magnet faces 30 of the rotor magnets 28 in a generally cylindrical pattern facing radially inward toward the drive shaft axis of rotation 10 and the stator poles 18. In this configuration, the rotor magnets 28 revolve around the stator poles 18.

Figure 3:
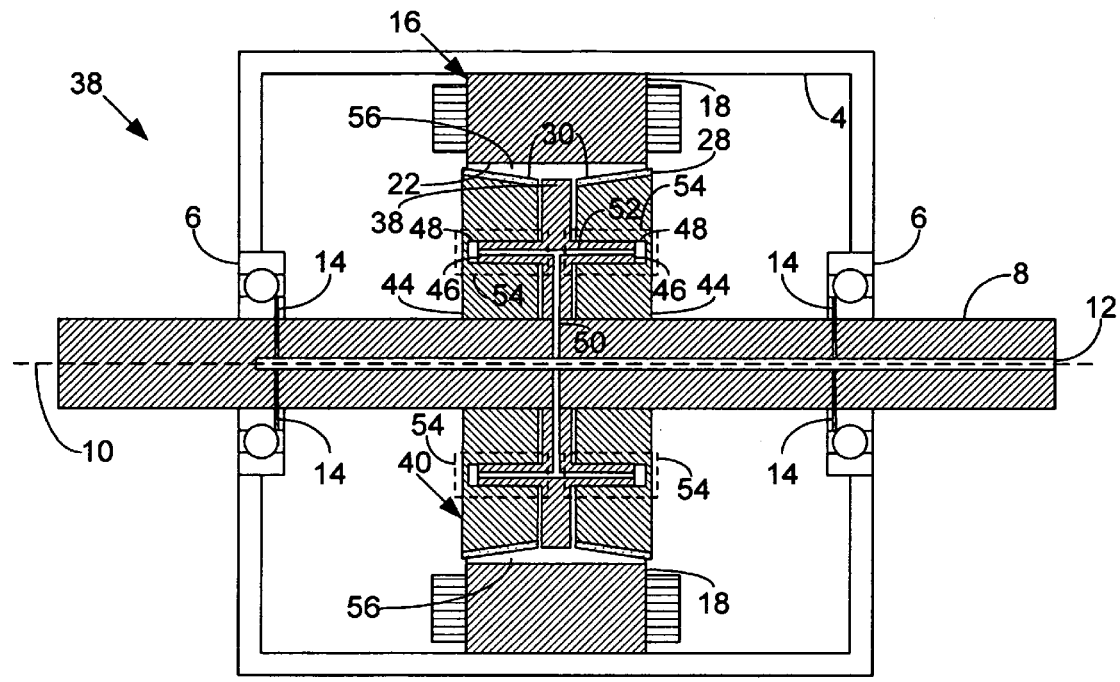
FIG. 3 is a cut-away side view of a permanent magnet type dynamoelectric machine of the conventional type according to a first possible embodiment of the invention that shows a split rotor assembly with rotor magnets in axial alignment with stator poles in a stator assembly.

FIG. 3 is a cut-away side view of a permanent magnet type dynamoelectric machine 38 of the conventional type according to a first possible embodiment of the invention. The dynamoelectric machine 38 comprises the stator assembly 16 hereinbefore described for the dynamoelectric machine 2 in connection with FIG. 1, with the pole faces 22 of the stator poles 18 arranged facing radially inward about a stator surface of revolution that approximates a cylinder toward a stator axis for the stator surface of revolution that is substantially coincident with the drive shaft axis of rotation 10. However, the dynamoelectric machine 38 also comprises a rotor assembly 40 that comprises a rotor yoke 42 coupled to two rotor hubs 44. The rotor yoke 42 couples to the drive shaft 8. Each rotor hub 44 couples to the rotor yoke 42 by way of at least one rotor yoke projection 46 that engages a at least one mating rotor hub aperture 48. Each rotor yoke projection 46 and mating rotor hub aperture 48 may comprise a generally cylindrical projection that engages a generally cylindrical aperture, in which case each rotor hub 44 couples to the rotor yoke 42 by way of a plurality of rotor yoke projections 46 and rotor hub apertures 48. Alternatively, each rotor yoke projection 46 and mating rotor hub aperture 48 may comprise a generally annular projection that engages a generally annular aperture, in which case each rotor hub 44 couples to the rotor yoke 42 by way of a single rotor yoke projection 46 and rotor hub aperture 48.

The rotor yoke 38 also comprises a rotor yoke lubrication oil channel 50 that communicates with the drive shaft lubrication oil channel 12. Each rotor yoke projection 46 comprises a projection lubrication oil channel 52 that extends from a free end of each rotor hub projection 46 to the rotor yoke lubrication oil channel 50. In this way, lubrication oil in the drive shaft lubrication channel 12 communicates with the rotor hub apertures 48 in each rotor hub 44.

Each rotor hub 44 mounts a plurality of the permanent rotor magnets 28 with their magnet faces 30 arranged facing radially outward about a rotor hub surface of revolution away from a rotor hub axis for the rotor hub surface of revolution that is substantially coincident with the drive shaft axis of rotation 10. The rotor hub surface of revolution tilts with respect to the rotor hub axis and thus it is not generally cylindrical. It may approximate a conical frustum, as shown, or any other non-cylindrical surface of revolution, such as a parabolic frustum. The two rotor hubs 44 mounted on the rotor yoke 42 form a rotor surface of revolution that is tilted from a rotor axis for the rotor surface of revolution that is substantially coincident with the drive shaft axis of rotation 10 to form a non-cylindrical surface of revolution that tilts with respect to the rotor axis. When the rotor hub surface of revolution for each rotor hub 44 approximates a conical frustum as shown, the rotor surface of revolution approximates a twin nappe cone or hourglass-shaped surface of revolution. Just as with the dynamoelectric machine 2 hereinbefore described in connection with FIG. 1, the rotor hub surface of revolution is of smaller area than the stator surface of revolution. The rotor magnets 26 thus revolve within the stator poles 18.

Figure 4:
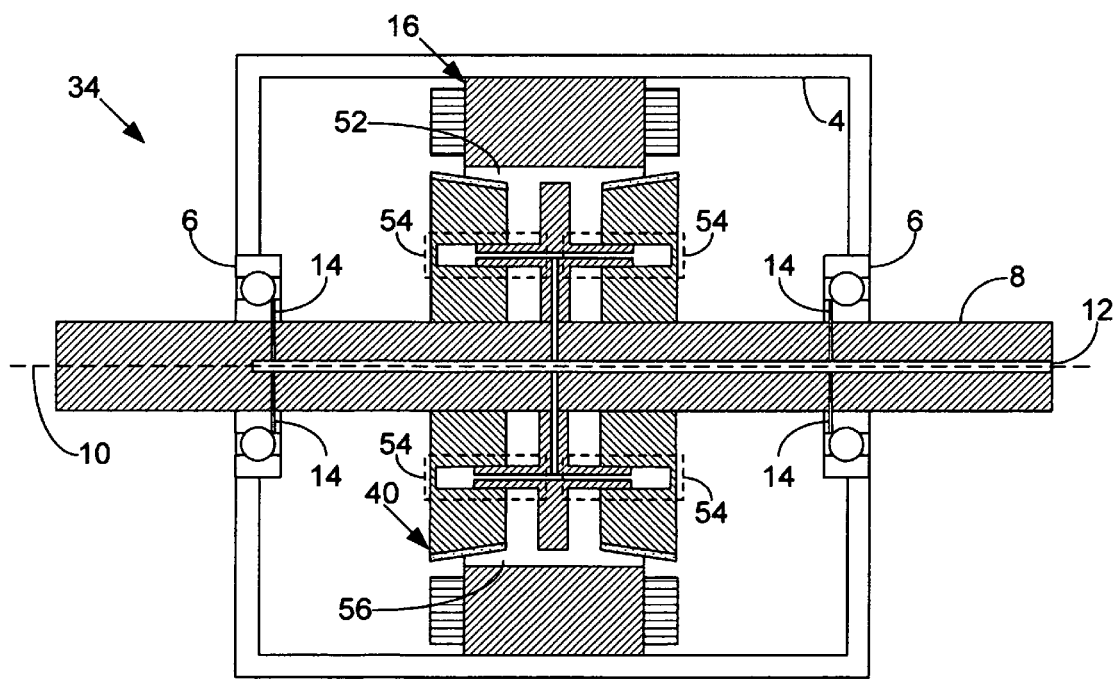
FIG. 4 is a cut-away side view of the dynamoelectric machine of FIG. 3 that shows the rotor assembly with its rotor magnets partially displaced from axial alignment with the stator poles in the stator assembly.
Figure 5:
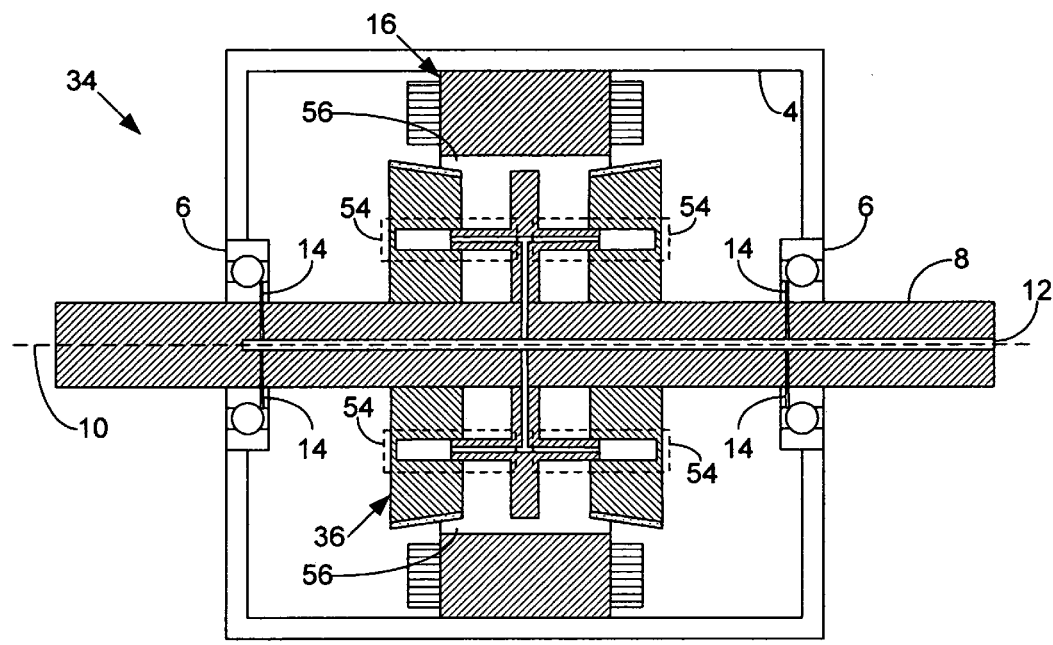
FIG. 5 is a cut-away side view of the dynamoelectric machine of FIGS. 3 and 4 that shows the rotor assembly with its rotor magnets fully displaced from axial alignment with the stator poles in the stator assembly.

In operation, each rotor yoke projection 46 and rotor hub aperture 48 pair serves as a hydraulic actuator 54 that tends to move each rotor hub 44 axially away from the rotor yoke 42 with increasing lubrication oil pressure delivered to the drive shaft lubrication oil channel 12 and communicated to each hydraulic actuator 54 by way of the rotor yoke lubrication oil channel 50 and each projection lubrication oil channel 52. FIG. 4 shows the dynamoelectric machine 38 with increased lubrication oil pressure that causes each hydraulic actuator 54 to expand outward from the rotor yoke 42 and displace each rotor hub 44 from general axial alignment with the pole faces 22 of the stator poles 18. FIG. 5 shows the dynamoelectric machine 38 with maximum lubrication oil pressure that causes each hydraulic actuator 54 to expand still further and displace each rotor hub 44 to a maximum degree of misalignment with the pole faces 22 of the stator poles 18.

Considering FIGS. 3, 4 and 5 together, an air gap 56 between the rotor assembly 40 and the stator assembly 16 changes non-linearly with axial misalignment of the rotor hubs 44. Since the magnetic reluctance is inversely proportional to the area of the air gap 56 and inversely proportional to the square of the length of the air gap 56, a small amount of axial displacement of each rotor hub 44 causes a considerable change in magnetic reluctance, and therefore magnetic flux interaction, between the stator assembly 16 and the rotor assembly 40. Furthermore, since the two rotor hubs 44 effectively split the rotor assembly 40, a smaller degree of misalignment of the rotor hubs 44 is needed to achieve a desired degree of magnetic reluctance compared to a single solid rotor hub such as the rotor hub 24 for the dynamoelectric machine 2 hereinbefore described in connection with FIG. 1.

Figure 6:
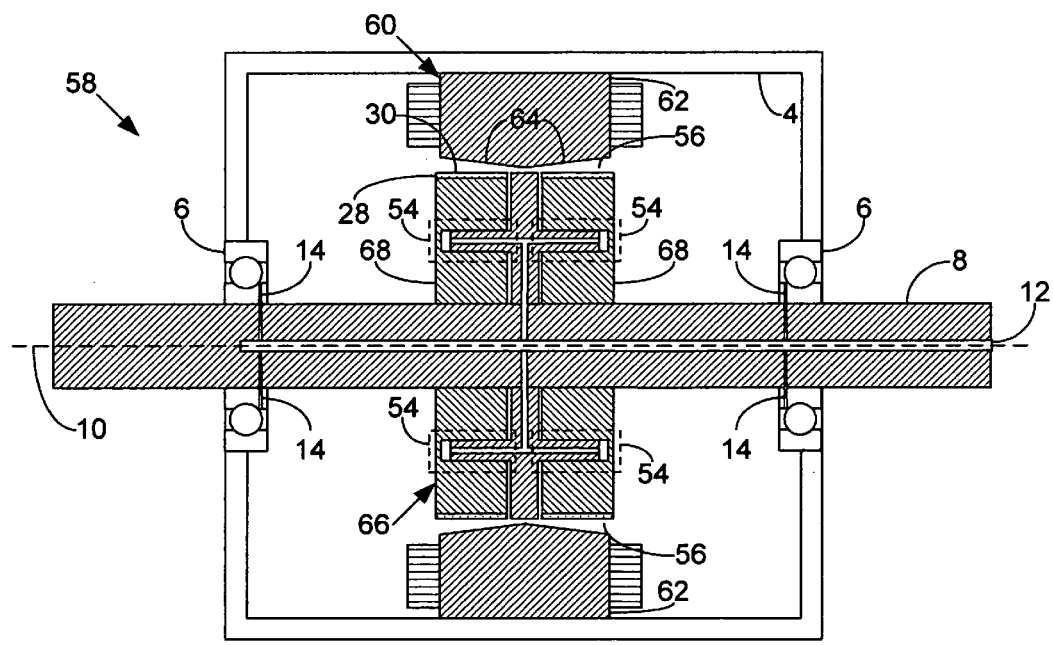
FIG. 6 is a cut-away side view of a permanent magnet type dynamoelectric machine of the conventional type according to a second possible embodiment of the invention that shows a split rotor assembly with rotor magnets in axial alignment with stator poles in a stator assembly.

FIG. 6 is a cut-away side view of a permanent magnet type dynamoelectric machine 56 of the conventional type according to a second possible embodiment of the invention. In this case, the dynamoelectric machine 58 has a stator assembly 60 that comprises a plurality of stator poles 62. Each stator pole 62 comprises a pair of pole faces 64 with an obtuse angle between them. The stator assembly 60 has the stator poles 62 arranged with their pole faces 64 forming a stator surface of revolution that tilts with respect to a stator axis for the stator surface of revolution that is substantially coincident with the drive shaft axis of rotation 10. The resulting stator surface of rotation forms an approximation of a twin nappe cone or hourglass-shaped surface of revolution.

The dynamoelectric machine 56 also comprises a rotor assembly 66 that is similar to the rotor assembly 40 hereinbefore described in connection with FIGS. 3 through 5, except that it comprises a pair of rotor hubs 68 that mount a plurality of the rotor magnets 28 arranged with their magnet faces 30 forming a surface of revolution that is substantially parallel with a rotor axis for the rotor surface of revolution that is substantially coincident with the drive shaft axis of rotation 10. The resulting rotor surface of rotation is substantially cylindrical.

Just as the case with the dynamoelectric machine 34 hereinbefore described in connection with FIGS. 3 through 5, the resulting air gap 58 between the rotor assembly 66 and the stator assembly 60 changes non-linearly with axial misalignment of the rotor hubs 68 in response to changes in lubrication oil pressure applied to the drive shaft lubrication oil channel 12. Thus, a small degree of misalignment of the rotor hubs 68 may result in a large change in magnetic reluctance.

Figure 7:
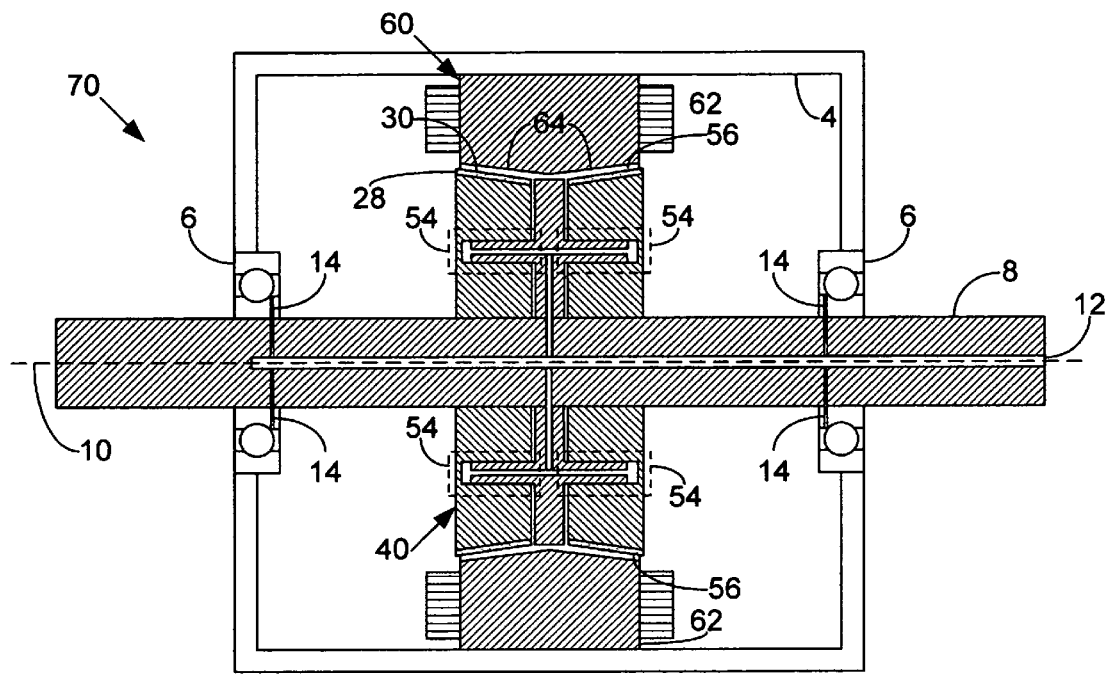
FIG. 7 is a cut-away side view of a permanent magnet type dynamoelectric machine of the conventional type according to a third possible embodiment of the invention that shows a split rotor assembly with rotor magnets in axial alignment with stator poles in a stator assembly.

FIG. 7 is a cut-away side view of a permanent magnet type dynamoelectric machine 70 of the conventional type according to a third possible embodiment of the invention. The dynamoelectric machine comprises the combination of the stator assembly 60 hereinbefore described in connection with FIG. 6 with the rotor assembly 40 in connection with FIGS. 3 through 5.

Figure 8:
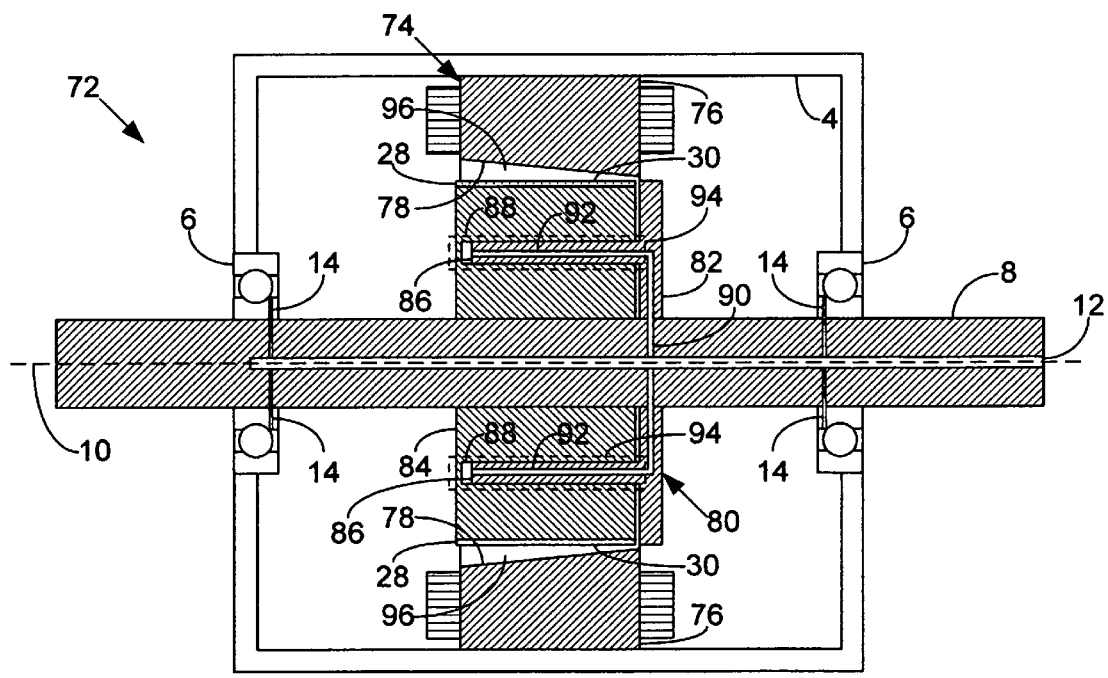
FIG. 8 is a cut-away side view of a permanent magnet type dynamoelectric machine of the conventional type according to a fourth possible embodiment of the invention that shows a solid rotor assembly with rotor magnets in axial alignment with stator poles in a stator assembly.

FIG. 8 is a cut-away side view of a permanent magnet type dynamoelectric machine 72 of the conventional type according to a fourth possible embodiment of the invention. The dynamoelectric machine 72 comprises a stator assembly 74 that comprises a plurality of stator poles 76 with associated pole faces 78. The stator assembly 74 mounts the stator poles 76 to arrange their pole faces 78 around a surface of revolution that tilts relative to a stator axis for the stator surface of revolution that substantially coincides with the drive shaft axis of rotation 10. The surface of revolution may be that of a conical frustum as shown in FIG. 8 or any other convenient non-cylindrical surface of revolution, such as a parabolic frustum.

The dynamoelectric machine also comprises a rotor assembly 80. The rotor assembly 80 comprises a rotor yoke 82 coupled to a rotor hub 84. The rotor yoke 82 couples to the drive shaft 8. The rotor hub 84 couples to the rotor yoke 42 by way of at least one rotor yoke projection 86 that engages at least one mating rotor hub aperture 88. Each rotor yoke projection 86 and mating rotor hub aperture 88 may comprise a generally cylindrical projection that engages a generally cylindrical aperture, in which case each rotor hub 84 couples to the rotor yoke 82 by way of a plurality of rotor yoke projections 86 and rotor hub apertures 88. Alternatively, each rotor yoke projection 86 and mating rotor hub aperture 88 may comprise a generally annular projection that engages a generally annular aperture, in which case each rotor hub 84 couples to the rotor yoke 82 by way of a single rotor yoke projection 86 and rotor hub aperture 88.

The rotor yoke 38 also comprises a rotor yoke lubrication oil channel 90 that communicates with the drive shaft lubrication oil channel 12. Each rotor yoke projection 86 comprises a projection lubrication oil channel 92 that extends from a free end of each rotor projection 86 to the rotor yoke lubrication oil channel 90. In this way, lubrication oil in the drive shaft lubrication channel 12 communicates with the rotor hub apertures 88 in the rotor hub 84.

The rotor hub 84 mounts a plurality of the permanent rotor magnets 28 with their magnet faces 30 arranged facing radially outward about a rotor surface of revolution away from a rotor axis for the rotor surface of revolution that is substantially coincident with the drive shaft axis of rotation 10. The rotor surface of revolution tilts with respect to the rotor axis and thus it is not generally cylindrical. It may approximate a conical frustum, as shown, or any other non-cylindrical surface of revolution, such as a parabolic frustum.

Figure 9:
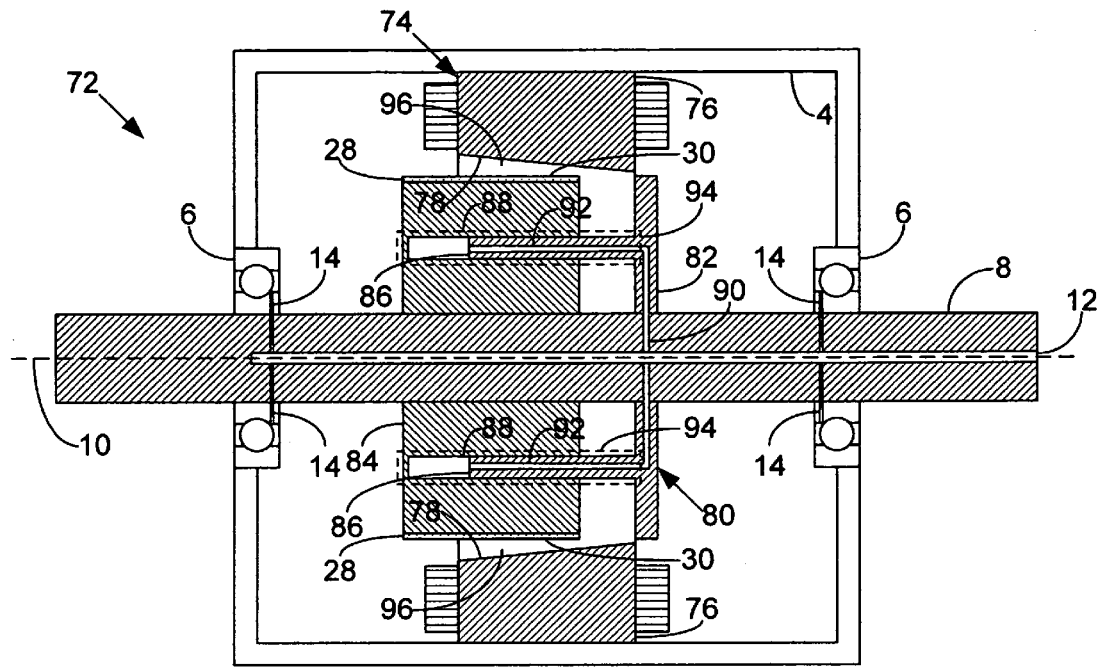
FIG. 9 is a cut-away side view of the dynamoelectric machine of FIG. 8 that shows the rotor assembly with its rotor magnets partially displaced from axial alignment with the stator poles in the stator assembly.
Figure 10:
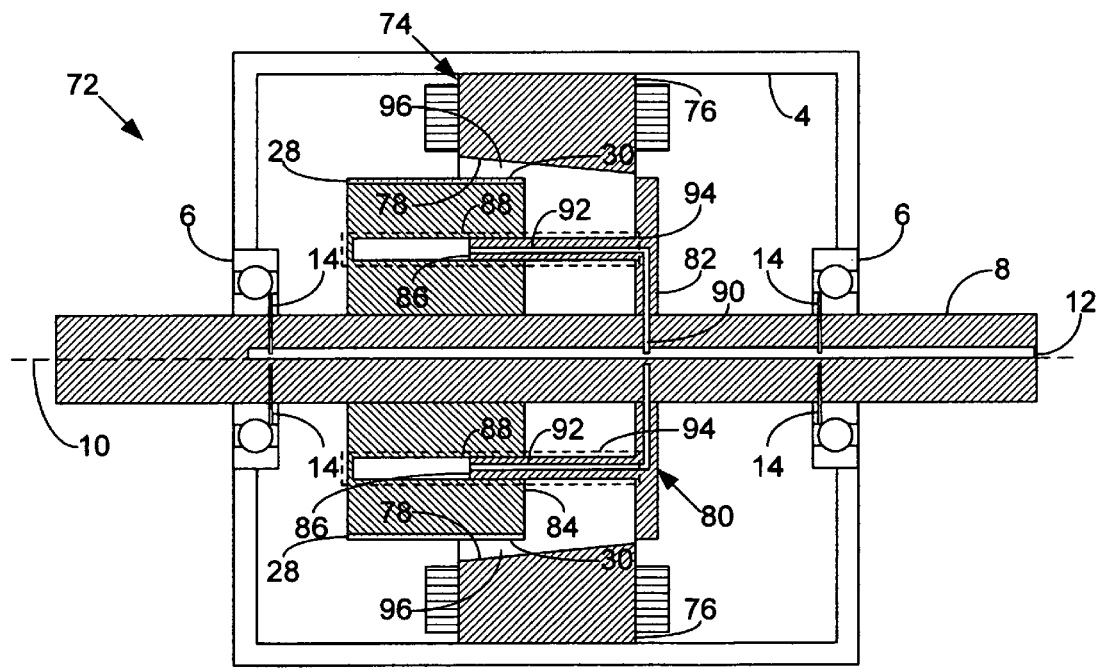
FIG. 10 is a cut-away side view of the dynamoelectric machine of FIGS. 8 and 9 that shows the rotor assembly with its rotor magnets fully displaced from axial alignment with the stator poles in the stator assembly.

In operation, each rotor yoke projection 86 and rotor hub aperture 88 pair serves as a hydraulic actuator 94 that tends to move the rotor hub 84 axially away from the rotor yoke 82 with increasing lubrication oil pressure delivered to the drive shaft lubrication oil channel 12 and communicated to each hydraulic actuator 94 by way of the rotor yoke lubrication oil channel 90 and each projection lubrication oil channel 92. FIG. 9 shows the dynamoelectric machine 72 with increased lubrication oil pressure that causes each hydraulic actuator 94 to expand outward from the rotor yoke 82 and displace the rotor hub 94 from general axial alignment with the pole faces 22 of the stator poles 18. FIG. 10 shows the dynamoelectric machine 72 with maximum lubrication oil pressure that causes each hydraulic actuator 94 to expand still further and displace the rotor hub 94 to a maximum degree of misalignment with the pole faces 22 of the stator poles 18.

Considering FIGS. 8, 9 and 10 together, an air gap 96 between the rotor assembly 80 and the stator assembly 74 changes non-linearly with axial misalignment of the rotor hub 84. Since the magnetic reluctance is inversely proportional to the area of the air gap 96 and inversely proportional to the square of the length of the air gap 96, a small amount of axial displacement of the rotor hub 84 causes a considerable change in magnetic reluctance, and therefore magnetic flux interaction, between the stator assembly 74 and the rotor assembly 80.

Figure 11:
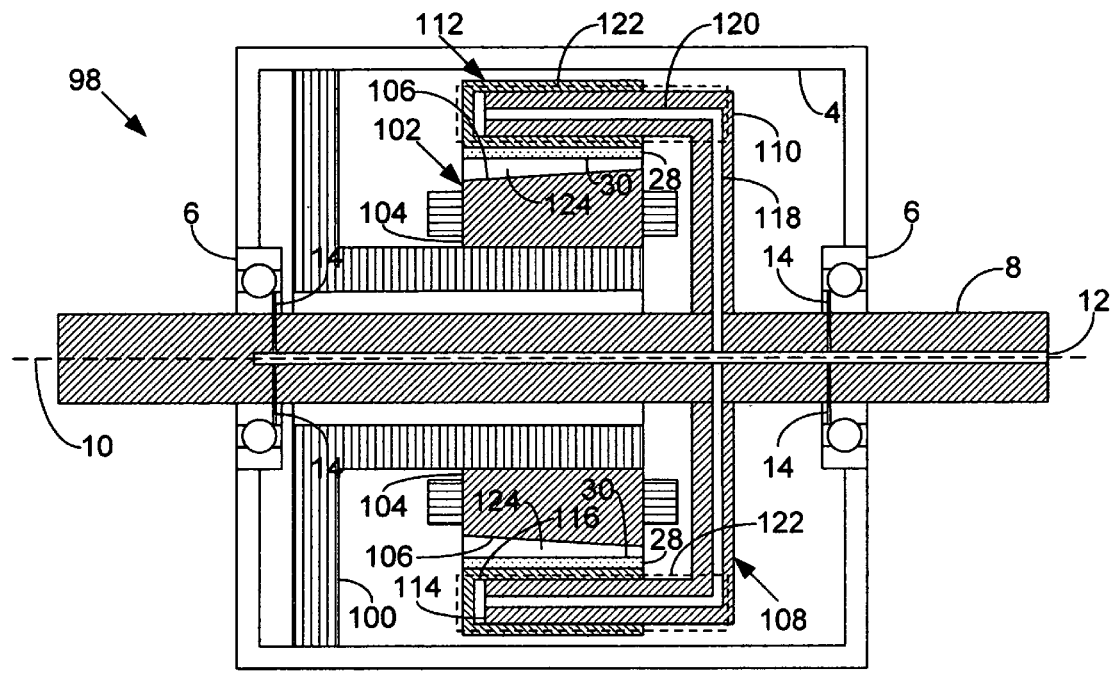
FIG. 11 is a cut-away side view of a permanent magnet type dynamoelectric machine of the "inside out" type according to a fifth possible embodiment of the invention that shows a solid rotor assembly with rotor magnets in axial alignment with stator poles in a stator assembly.

FIG. 11 is a cut-away side view of a permanent magnet type dynamoelectric machine 98 of the "inside out" type according to a fifth possible embodiment of the invention. The dynamoelectric-machine 98 comprises a stator hub 100 that mounts a stator assembly 102. The stator assembly 102 comprises a plurality of stator poles 104 with pole faces 106. The stator assembly 102 mounts the stator poles 104 to arrange their pole faces 106 around a surface of revolution that tilts relative to a stator axis for the stator surface of revolution that substantially coincides with the drive shaft axis of rotation 10. The surface of revolution may be that of a conical frustum as shown in FIG. 11 or any other convenient non-cylindrical surface of revolution, such as a parabolic frustum.

The dynamoelectric machine 98 also comprises a rotor assembly 108. The rotor assembly 108 comprises a rotor yoke 110 coupled to a rotor hub 112. The rotor yoke 110 couples to the drive shaft 8. The rotor hub 112 couples to the rotor yoke 110 by way of at least one rotor yoke projection 114 that engages at least one mating rotor hub aperture 116. Each rotor yoke projection 114 and mating rotor hub aperture 116 may comprise a generally cylindrical projection that engages a generally cylindrical aperture, in which case each rotor hub 112 couples to the rotor yoke 110 by way of a plurality of rotor yoke projections 114 and rotor hub apertures 116. Alternatively, each rotor yoke projection 114 and mating rotor hub aperture 116 may comprise a generally annular projection that engages a generally annular aperture, in which case each rotor hub 112 couples to the rotor yoke 110 by way of a single rotor yoke projection 114 and rotor hub aperture 116.

The rotor yoke 110 also comprises a rotor yoke lubrication oil channel 118 that communicates with the drive shaft lubrication oil channel 12. Each rotor yoke projection 114 comprises a projection lubrication oil channel 120 that extends from a free end of each rotor projection 114 to the rotor yoke lubrication oil channel 118. In this way, lubrication oil in the drive shaft lubrication channel 12 communicates with the rotor hub apertures 116 in the rotor hub 112.

The rotor hub 112 mounts a plurality of the permanent rotor magnets 28 with their magnet faces 30 arranged facing radially inward about a rotor surface of revolution toward a rotor axis for the rotor surface of revolution that is substantially coincident with the drive shaft axis of rotation 10. The rotor surface of revolution is substantially parallel with respect to the rotor axis and thus it is substantially cylindrical.

Figure 12:
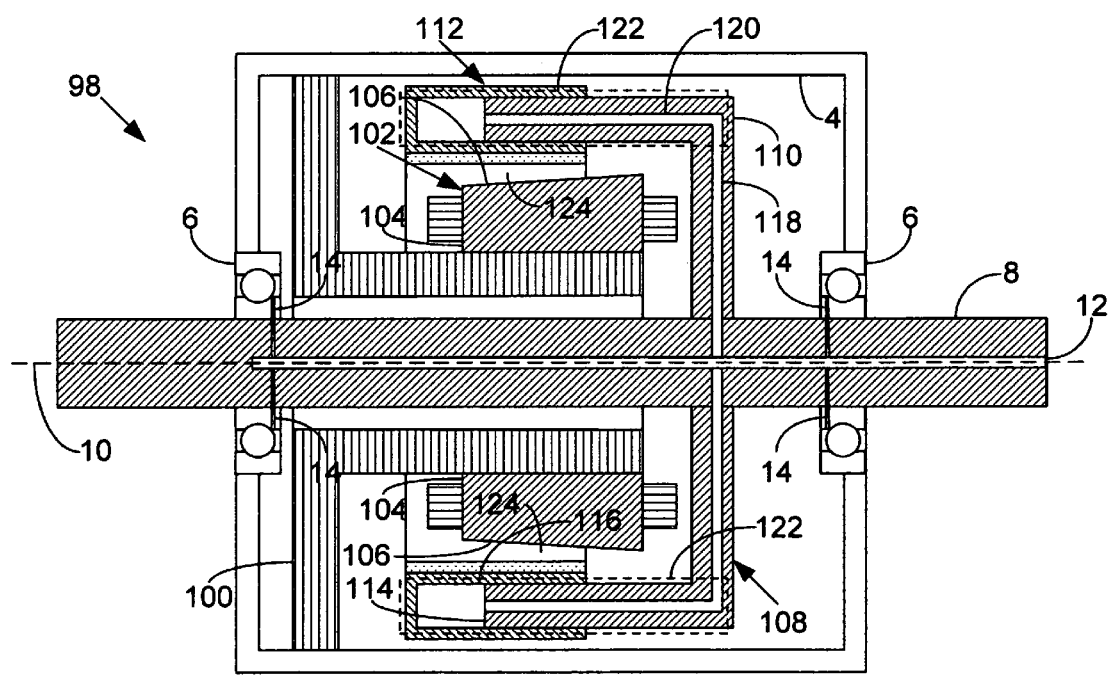
FIG. 12 is a cut-away side view of the dynamoelectric machine of FIG. 11 that shows the rotor assembly with its rotor magnets partially displaced from axial alignment with the stator poles in the stator assembly.
Figure 13:
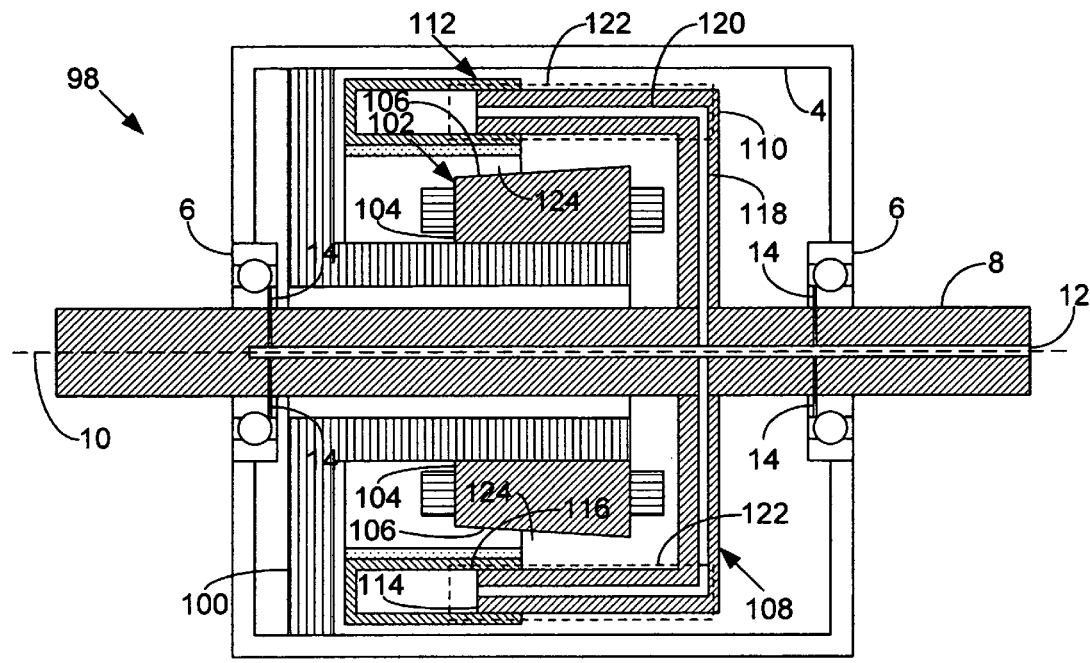
FIG. 13 is a cut-away side view of the dynamoelectric machine of FIGS. 11 and 12 that shows the rotor assembly with its rotor magnets fully displaced from axial alignment with the stator poles in the stator assembly.

In operation, each rotor yoke projection 114 and rotor hub aperture 116 pair serves as a hydraulic actuator 122 that tends to move the rotor hub 112 axially away from the rotor yoke 110 with increasing lubrication oil pressure delivered to the drive shaft lubrication oil channel 12 and communicated to each hydraulic actuator 122 by way of the rotor yoke lubrication oil channel 118 and each projection lubrication oil channel 120. FIG. 12 shows the dynamoelectric machine 98 with increased lubrication oil pressure that causes each hydraulic actuator 122 to expand outward from the rotor yoke 110 and displace the rotor hub 112 from general axial alignment with the pole faces 106 of the stator poles 104. FIG. 13 shows the dynamoelectric machine 98 with maximum lubrication oil pressure that causes each hydraulic actuator 122 to expand still further and displace the rotor hub 94 to a maximum degree of misalignment with the pole faces 106 of the stator poles 104.

Considering FIGS. 11, 12 and 13 together, an air gap 124 between the rotor assembly 108 and the stator assembly 102 changes non-linearly with axial misalignment of the rotor hub 84. Since the magnetic reluctance is inversely proportional to the area of the air gap 96 and inversely proportional to the square of the length of the air gap 96, a small amount of axial displacement of the rotor hub 112 causes a considerable change in magnetic reluctance, and therefore magnetic flux interaction, between the stator assembly 102 and the rotor assembly 108.

Figure 14:
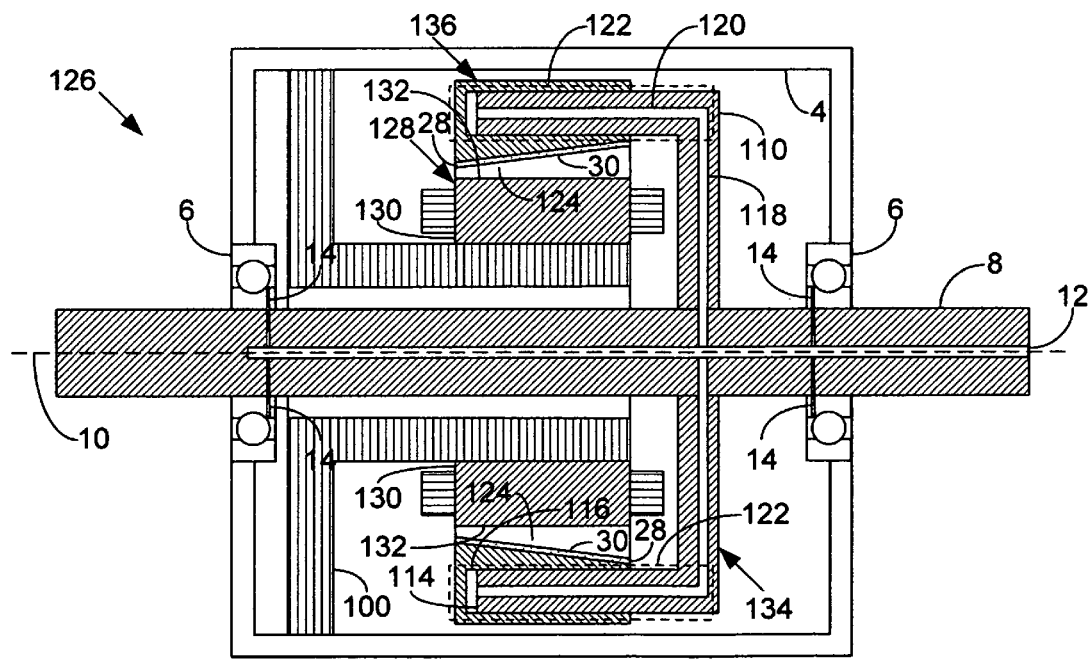
FIG. 14 is a cut-away side view of a permanent magnet type dynamoelectric machine of the "inside out" type according to a sixth possible embodiment of the invention that shows a solid rotor assembly with rotor magnets in axial alignment with stator poles in a stator assembly.

FIG. 14 is a cut-away side view of a permanent magnet type dynamoelectric machine 126 of the "inside out" type according to a sixth possible embodiment of the invention. It is similar in operation to the dynamoelectric machine hereinbefore described in connection with FIGS. 11 through 13. However, the dynamoelectric machine 126 comprises a stator assembly 128 mounted on the stator hub 100. The stator assembly 128 comprises a plurality of stator poles 130 with pole faces 132. The stator assembly 128 mounts the stator poles 130 to arrange their pole faces 132 radially outward about a surface of revolution away from a stator axis for the stator surface of revolution that is substantially coincident with the drive shaft axis 10. The stator surface of revolution is substantially parallel with the stator axis and thus it is substantially cylindrical.

The dynamoelectric machine 126 also comprises a rotor assembly 134. The rotor assembly 134 comprises the rotor yoke 110 that couples to a rotor hub 136 by way of at least one of the rotor yoke projections 114 that engages at least one of the mating rotor hub apertures 116 to serve as at least one of the hydraulic actuators 122. The rotor hub 136 mounts a plurality of the permanent rotor magnets 28 with their magnet faces 30 arranged facing radially inward about a rotor surface of revolution toward a rotor axis for the rotor surface of revolution that is substantially coincident with the drive shaft axis of rotation 10. The rotor surface of revolution tilts with respect to the rotor axis and thus it is not generally cylindrical. It may approximate a conical frustum, as shown, or any other non-cylindrical surface of revolution, such a parabolic frustum. The air gap 124 between the pole faces 130 and the magnet faces 30 changes exactly as hereinbefore described for the dynamoelectric machine 98 in connection with FIGS. 11 through 13.

Figure 15:
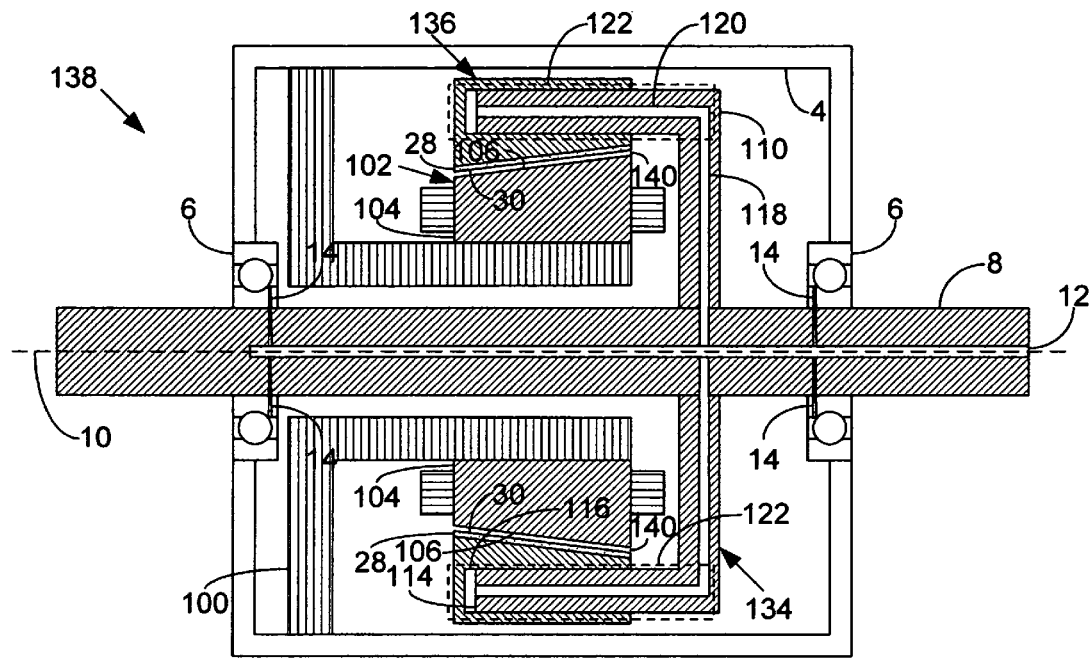
FIG. 15 is a cut-away side view of a permanent magnet type dynamoelectric machine of the "inside out" type according to a seventh possible embodiment of the invention that shows a rotor assembly with rotor magnets in axial alignment with stator poles in a stator assembly.

FIG. 15 is a cut-away side view of a permanent magnet type dynamoelectric machine 138 of the "inside out" type according to a seventh possible embodiment of the invention. It is similar in operation to the dynamoelectric machine 98 hereinbefore described in connection with FIGS. 11 through 13. The dynamoelectric machine 138 comprises the stator hub 100 and the stator assembly 102 for the dynamoelectric machine 98 hereinbefore described in. connection with FIGS. 11 through 13 in combination with the rotor assembly 134 for the dynamoelectric machine 128 hereinbefore described in connection with FIG. 14. An air gap 140 between the pole faces 106 and the magnet faces 30 tends to be smaller than the other embodiments of the invention hereinbefore described when the rotor hub 136 is in alignment with the stator assembly 102, thereby providing a greater maximum magnetic flux interaction between the stator assembly 102 and the rotor assembly 134.

Figure 16:
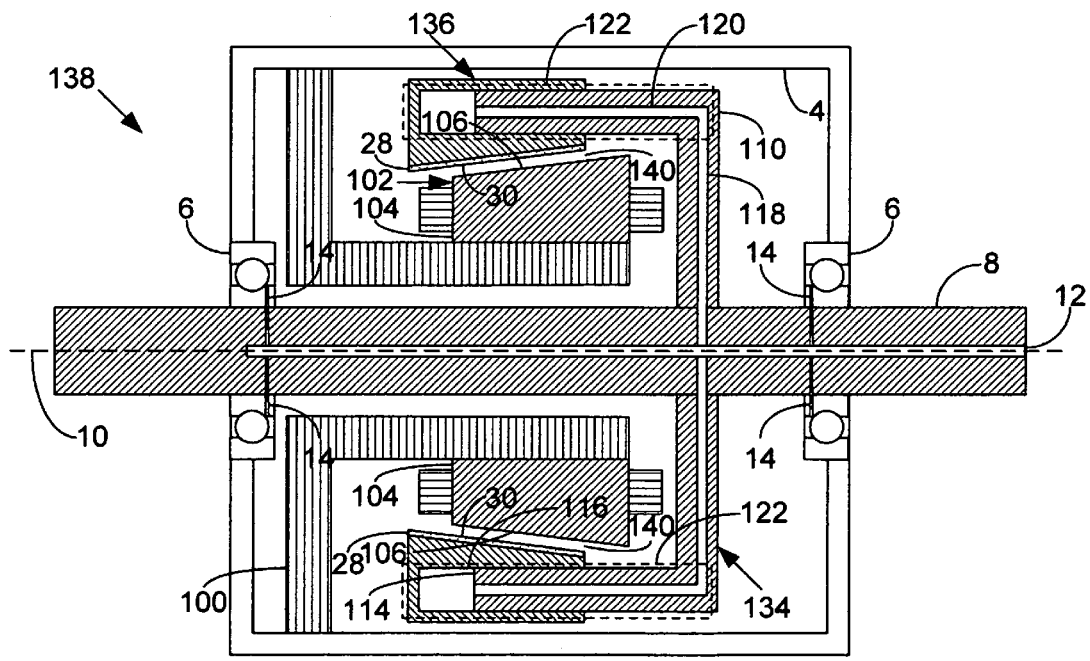
FIG. 16 is a cut-away side view of the dynamoelectric machine of FIG. 15 that shows the rotor assembly with its rotor magnets partially displaced from axial alignment with the stator poles in the stator assembly.
Figure 17:
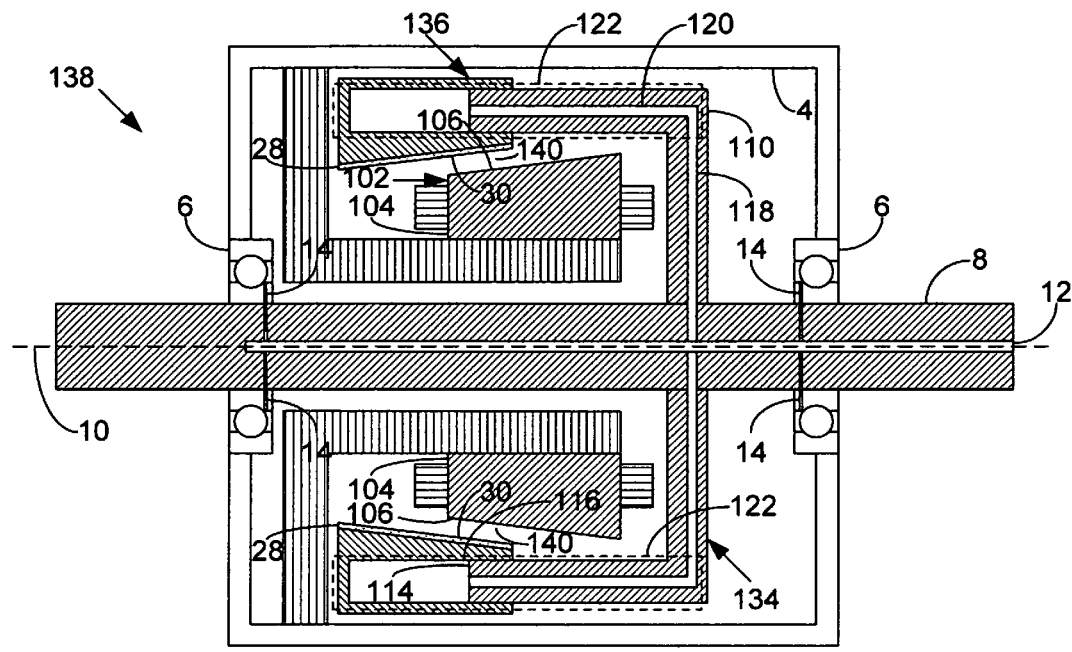
FIG. 17 is a cut-away side view of the dynamoelectric machine of FIGS. 15 and 16 that shows the rotor assembly with its rotor magnets fully displaced from axial alignment with the stator poles in the stator assembly.

FIG. 16 shows the dynamoelectric machine 128 with increased lubrication oil pressure that causes each hydraulic actuator 122 to expand outward from the rotor yoke 110 and displace the rotor hub 136 from general axial alignment with the pole faces 106 of the stator poles 104. FIG. 17 shows the dynamoelectric machine 128 with maximum lubrication oil pressure that causes each hydraulic actuator 122 to expand still further and displace the rotor hub 136 to a maximum degree of misalignment with the pole faces 106 of the stator poles 104. Considering FIGS. 15, 16 and 17 together, the air gap 140 changes in length and area with increasing axial misalignment of the rotor hub 136. Since the magnetic reluctance is inversely proportional to the area of the air gap 140 and inversely proportional to the square of the length of the air gap 140, a small amount of axial displacement of the rotor hub 136 causes a considerable change in magnetic reluctance, and therefore magnetic flux interaction, between the stator assembly 102 and the rotor assembly 134.

Figure 18:
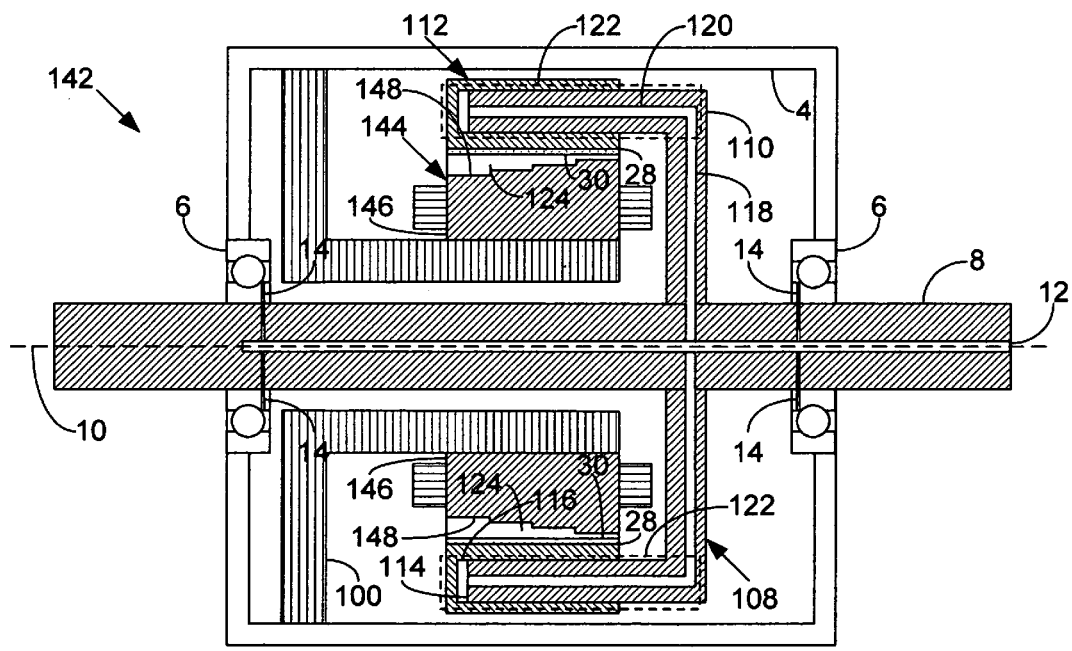
FIG. 18 is a cut-away side view of a permanent magnet type dynamoelectric machine of the "inside out" type according to an eighth possible embodiment of the invention that shows a rotor assembly with rotor magnets in axial alignment with stator poles in a stator assembly.

According to the invention, the stator surface of revolution, the rotor surface of revolution, or both may comprise a plurality of discrete steps to approximate a continuous curve. As one example, FIG. 18 is a cut-away side view of a permanent magnet type dynamoelectric machine 142 of the "inside out" type according to an eighth possible embodiment of the invention that is equivalent to the dynamoelectric machine 98 hereinbefore described in connection with FIGS. 11 through 13 except that it comprises a stator assembly 144 comprising a plurality of stator poles 146 with pole faces 148. Each pole face 148 has a plurality of steps that approximates the same stator surface of revolution hereinbefore described for the dynamoelectric machine 98 in connection with FIGS. 11 through 13. Alternatively, a dynamoelectric machine according to the invention may have a rotor surface of revolution approximated by such a plurality of steps or may have both the stator and the rotor surfaces of revolution approximated by such a plurality of steps.

Figure 19:
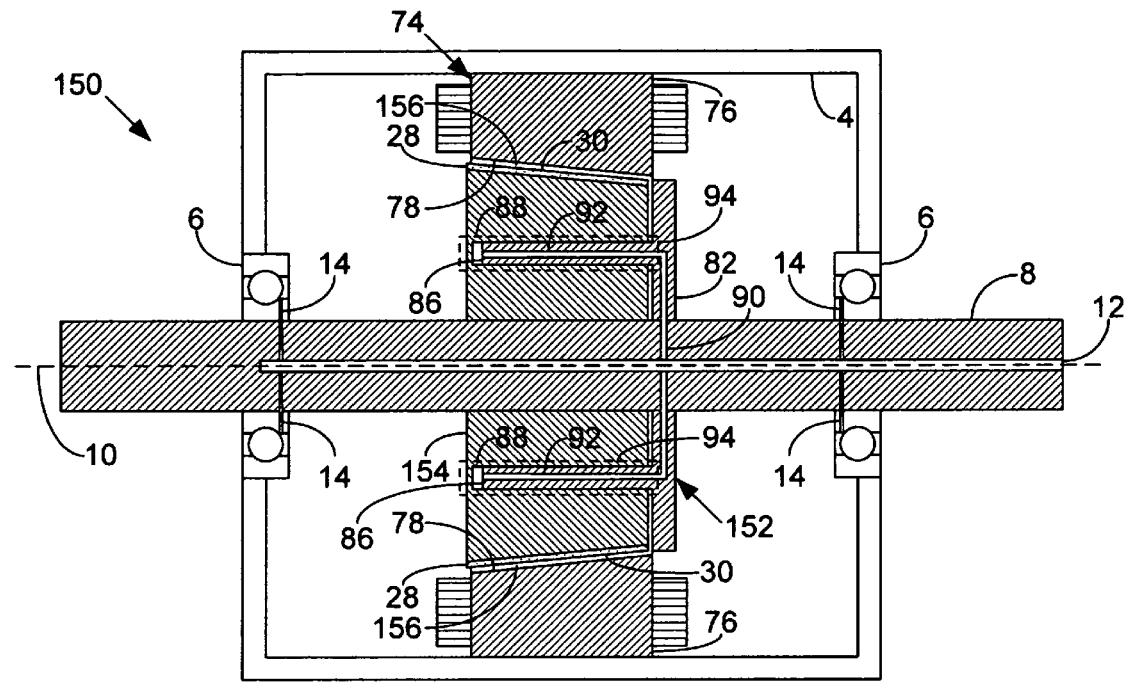
FIG. 19 is a cut-away side view of a permanent magnet type dynamoelectric machine of the conventional type according to a ninth possible embodiment of the invention that shows a rotor assembly with rotor magnets in axial alignment with stator poles in a stator assembly.

FIG. 19 is a cut-away side view of a permanent magnet type dynamoelectric machine 150 of the conventional type according to a ninth possible embodiment of the invention. It is similar in operation to the dynamoelectric machine 72 described in connection with FIGS. 8 through 10. The dynamoelectric machine 150 comprises the stator assembly 74 for the dynamoelectric machine hereinbefore described in connection with FIGS. 8 through 10. It also comprises a rotor assembly 152 that is similar to the rotor assembly 80 for the dynamoelectric machine hereinbefore described in connection with FIGS. 8 through 10 except that it comprises a rotor hub 154 in place of the rotor hub 84.

The rotor hub 154 mounts a plurality of the rotor magnets 28 with their magnet faces 30 arranged facing radially outward about a rotor surface of revolution away from a rotor axis for the rotor surface of revolution that is substantially coincident with the drive shaft axis of rotation 10. The rotor surface of revolution tilts with respect to the rotor axis and thus it is not generally cylindrical. It may approximate a conical frustum, as shown, or any other non-cylindrical surface of revolution, such a parabolic frustum. An air gap 156 between the pole faces 130 and the magnet faces 30 changes exactly as hereinbefore described for the dynamoelectric machine 98 in connection with FIGS. 11 through 13.

Figure 20:
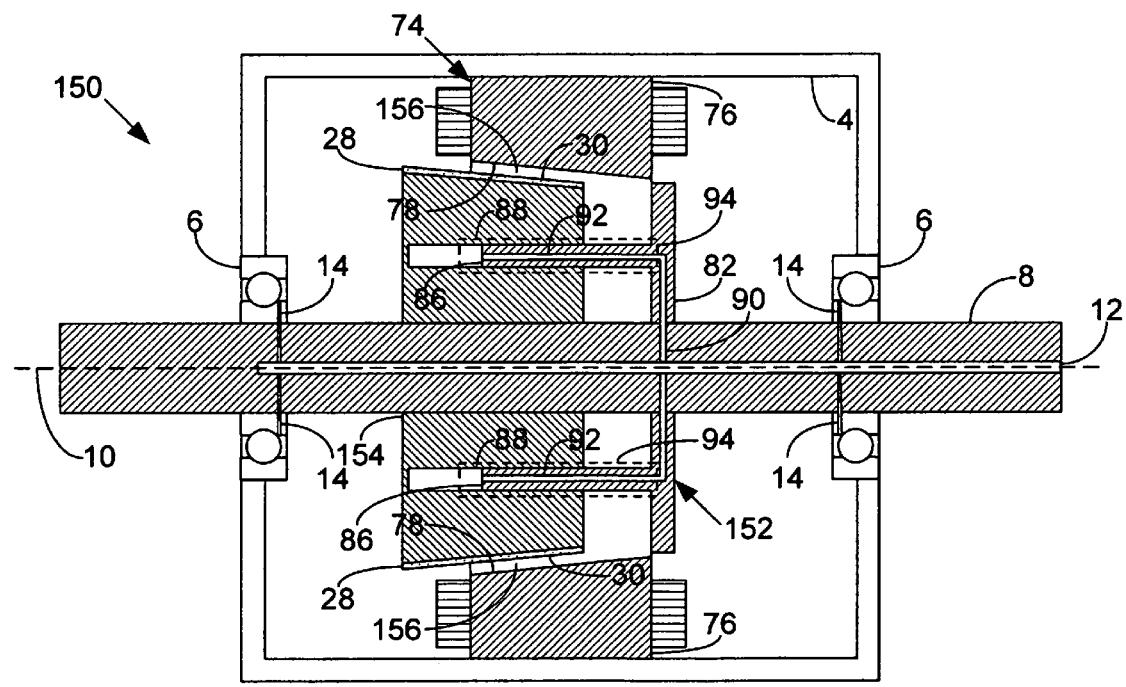
FIG. 20 is a cut-away side view of the dynamoelectric machine of FIG. 19 that shows the rotor assembly with its rotor magnets partially displaced from axial alignment with the stator poles in the stator assembly.
Figure 21:
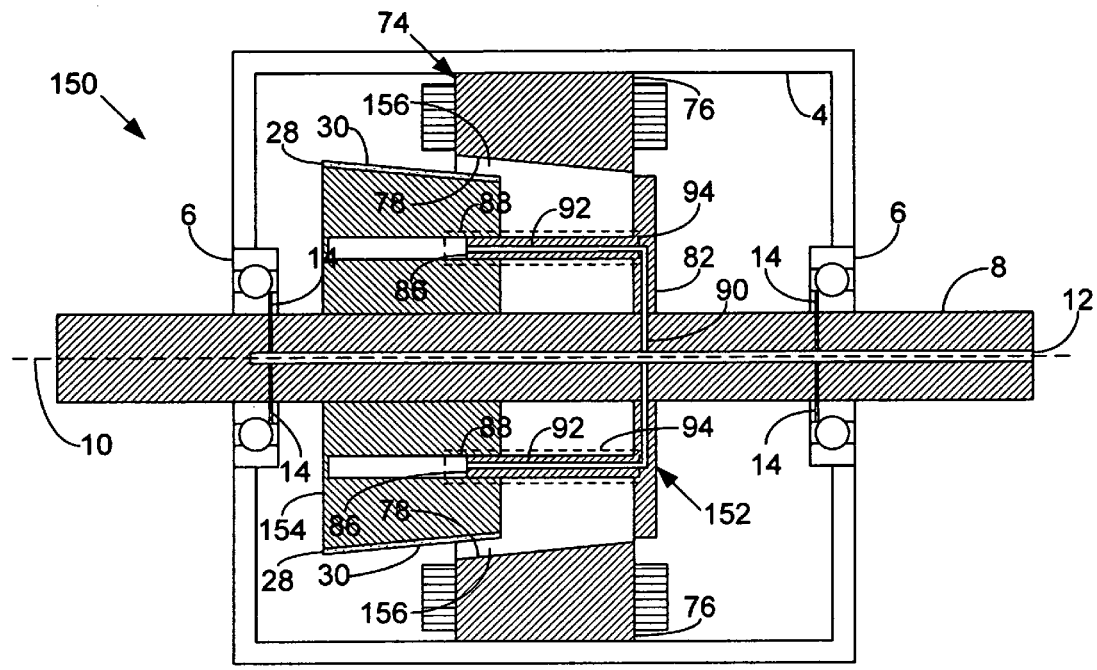
FIG. 21 is a cut-away side view of the dynamoelectric machine of FIGS. 19 and 20 that shows the rotor assembly with its rotor magnets fully displaced from axial alignment with the stator poles in the stator assembly.

FIG. 20 shows the dynamoelectric machine 152 with increased lubrication oil pressure that causes each hydraulic actuator 94 to expand outward from the rotor yoke 82 and displace the rotor hub 154 from general axial alignment with the pole faces 78 of the stator poles 76. FIG. 21 shows the dynamoelectric machine 150 with maximum lubrication oil pressure that causes each hydraulic actuator 94 to expand still further and displace the rotor hub 154 to a maximum degree of misalignment with the pole faces 78 of the stator poles 76. Considering FIGS. 19, 20 and 21 together, the air gap 140 changes in length and area with increasing axial misalignment of the rotor hub 154. Since the magnetic reluctance is inversely proportional to the area of the air gap 156 and inversely proportional to the square of the length of the air gap 156, a small amount of axial displacement of the rotor hub 154 causes a considerable change in magnetic reluctance, and therefore magnetic flux interaction, between the stator assembly 74 and the rotor assembly 152.

Figure 22:
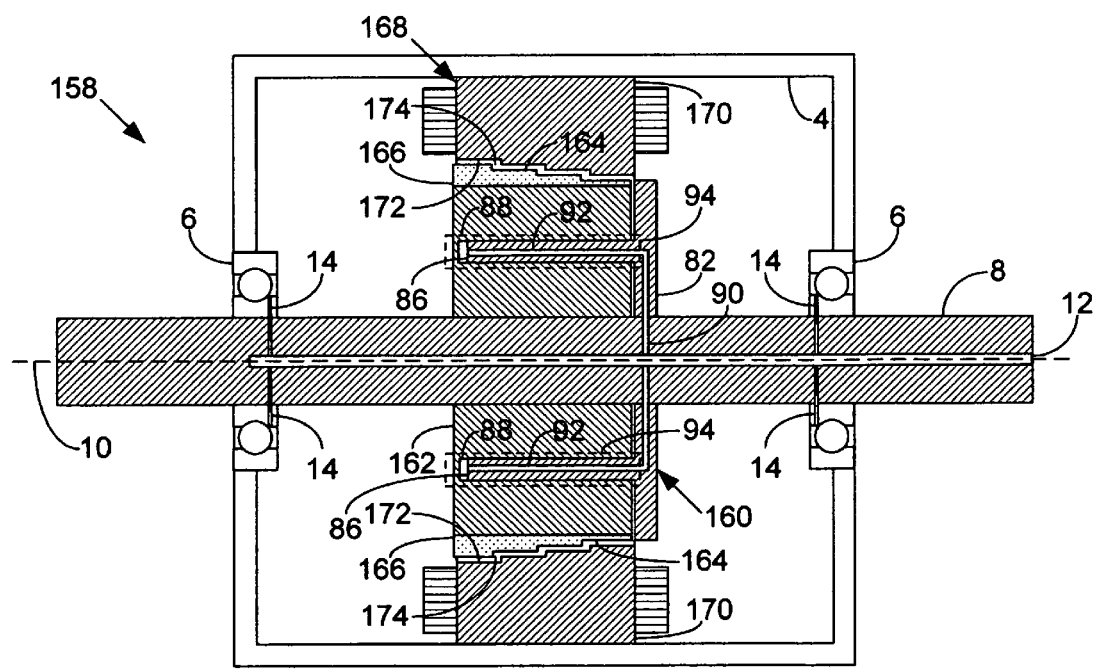
FIG. 22 is a cut-away side view of a permanent magnet type dynamoelectric machine of the conventional type according to a tenth possible embodiment of the invention that shows a rotor assembly with rotor magnets in axial alignment with stator poles in a stator assembly.

Alternatively, a dynamoelectric machine according to the invention may have a rotor or stator surface of revolution approximated by such a plurality of steps or it may have both the stator and the rotor surfaces of revolution approximated by such a plurality of steps. FIG. 22 is a cut-away side view of a permanent magnet type dynamoelectric machine 158 of the conventional type according to a tenth possible embodiment of the invention. It is very similar in operation to the dynamoelectric machine 150 hereinbefore described in connection with FIGS. 19 through 21. The dynamoelectric machine 158 comprises a rotor assembly 160 that is identical to the rotor assembly 152 except that it comprises a rotor hub 162 instead of the rotor hub 154. The rotor hub 162 mounts a plurality of rotor magnets 164 with their magnet faces 166 arranged facing radially inward about a rotor surface of revolution toward a rotor axis for the rotor surface of revolution that is substantially coincident with the drive shaft axis of rotation 10. Each of the magnet faces 166 has a plurality of steps that approximates the same rotor surface of revolution hereinbefore described for the dynamoelectric machine 150 in connection with FIGS. 19 through 21.

The dynamoelectric machine 158 also comprises a stator assembly 168 that is identical to the stator assembly 74 except that it comprises a plurality of stator poles 170 with pole faces 172. Just as with the dynamoelectric machine 142 hereinbefore described in connection with FIG. 18, each of the pole faces 172 has a plurality of steps that approximates the same stator surface of revolution hereinbefore described for the dynamoelectric machine 150 in connection with FIGS. 19 through 21. An air gap 174 between the pole faces 174 and the magnet faces 30 changes much the same as hereinbefore described for the dynamoelectric machine 150 in connection with FIGS. 19 through 21.

For any of the dynamoelectric machines hereinbefore described that have a stator surface of revolution not parallel to the rotor surface of revolution, the length of the air gap between them changes over its area. This causes a change in magnetic flux density over the air gap resulting in a magnetic force balance that may tend to bias its rotor hub or hubs away from its rotor yoke without increasing lubrication oil pressure. Changing the relative tilt between the rotor surface of revolution and the stator surface of revolution may secure any desired bias of its rotor hub or hubs from the rotor yoke without increasing lubrication oil pressure.

When any of the hereinbefore-described embodiments serve as a generator, control of lubrication oil pressure delivered to the drive shaft lubrication oil channel 12 may control electrical potential of power generated by the dynamoelectric machine. An electro-hydraulic control system may supply the lubrication oil pressure for best regulation. Alternatively, a dynamic pump, such as a centrifugal pump, or a positive displacement pump coupled to a suitable orifice and powered by the dynamoelectric machine may supply oil pressure for this purpose.

Furthermore, when any of the hereinbefore-described embodiments serve as a generator, increasing lubrication oil pressure to the drive shaft lubrication oil channel 12 upon detection of failure of electrical insulation for the stator pole windings 20 to retract the rotor magnets 30 from the stator assembly prevents stator overload that may cause a hazardous condition. An electro-hydraulic control system may control the lubrication oil pressure for this purpose.

When any of the hereinbefore-described embodiments of the invention serve as a motor, control of lubrication oil pressure delivered to the drive shaft lubrication oil channel 12 may control torque and rotational velocity of the dynamoelectric machine. An electro-hydraulic control system may supply the lubrication oil pressure for control purposes. Alternatively, a dynamic pump, such as a centrifugal pump, or a positive displacement pump coupled to a suitable orifice and powered by the dynamoelectric machine may supply oil pressure for this purpose.

The described embodiments of the invention are only some illustrative implementations of the invention wherein changes and substitutions of the various parts and arrangement thereof are within the scope of the invention as set forth in the attached claims.

What is claimed is:

1. A dynamoelectric machine that comprises:
   a stator that comprises a plurality of stator poles arranged around a stator surface of revolution with a stator axis for the stator surface of revolution;
   at least one rotor that comprises a plurality of permanent rotor magnets arranged around a rotor surface of revolution with a rotor axis for the rotor surface of revolution that is substantially coincident with the stator axis and with the rotor surface of revolution adjacent the stator surface of revolution;
   a drive shaft with a drive shaft axis of rotation that is substantially coincident with the stator axis coupled to the rotor for rotating the rotor relative to the stator about the drive shaft axis of rotation; and
   at least one axial hydraulic actuator mounted within each rotor for axially displacing the rotor surface of revolution along the drive shaft relative to the stator surface of revolution to change magnetic flux interaction between the stator poles and the rotor magnets;
   wherein at least one of the surfaces of revolution tilts with respect to the drive shaft axis of rotation.

2. The dynamoelectric machine of claim 1, wherein the rotor surface of revolution tilts with respect to the drive shaft axis of rotation.

3. The dynamoelectric machine of claim 1, wherein the stator surface of revolution tilts with respect to the drive shaft axis of rotation.

4. The dynamoelectric machine of claim 1, wherein the both the rotor and the stator surfaces of revolution tilt with respect to the drive shaft axis of rotation.

5. The dynamoelectric machine of claim 1, wherein a plurality of discrete steps approximates at least one of the surfaces of revolution.

6. The dynamoelectric machine of claim 1, wherein the rotor comprises a pair of rotor hubs mounted on opposite sides of a rotor yoke, the rotor hubs mount the rotor magnets and the actuators displace the rotor hubs from the rotor yoke to displace the rotor surface of revolution along the drive shaft relative to the stator surface of revolution.

7. The dynamoelectric machine of claim 1, wherein the rotor comprises a single rotor hub mounted on one side of a rotor yoke, the rotor hub mounts the rotor magnets and the actuators displace the rotor hub from the rotor yoke to displace the surface of revolution along the drive shaft relative to the stator surface of revolution.

8. The dynamoelectric machine of claim 1, wherein the rotor magnets rotate within the stator poles in a conventional machine configuration.

9. The dynamoelectric machine of claim 1, wherein the rotor magnets rotate around the stator poles in an "inside out" machine configuration.

10. The dynamoelectric machine of claim 1, wherein the machine serves as a generator for electrical power and each actuator axially displaces the rotor surface of revolution along the drive shaft relative to the stator surface of revolution to maintain constant electrical potential of the electrical power.

11. The dynamoelectric machine of claim 1, wherein the machine serves as a generator for electrical power and each actuator axially displaces the rotor surface of revolution along the drive shaft relative to the stator surface of revolution to reduce the electrical potential of the electrical power upon sensed stator electrical failure.

12. The dynamoelectric machine of claim 1, wherein the machine serves as a motor supplied by electrical power and each actuator axially displaces the rotor surface of revolution along the drive shaft relative to the stator surface of revolution to control torque and rotational velocity of the motor in response to the electrical power.

13. The dynamoelectric machine of claim 1, wherein the rotor surface of revolution has a tilt relative to the stator surface of rotation to create a magnetic force balance that provides an axial displacement bias of the rotor relative to the stator along the drive shaft axis of rotation.

14. The dynamoelectric machine of claim 1, wherein the drive shaft comprises a lubrication oil channel for receiving lubrication oil that extends from one end of the rotor shaft along the rotor axis and the plurality of actuators mount within the rotor and couple to the lubrication oil channel to axially displace the rotor surface of revolution along the drive shaft relative to the stator surface of revolution in response to lubrication oil pressure.

15. The dynamoelectric machine of claim 1, wherein each hydraulic actuator comprises a generally cylindrical rotor yoke projection from a rotor yoke that mates with a generally cylindrical rotor hub aperture in a rotor hub.

16. The dynamoelectric machine of claim 1, wherein each hydraulic actuator comprises a generally annular rotor yoke projection from a rotor yoke that mates with a generally annular rotor hub aperture in a rotor hub.

17. A dynamoelectric machine that comprises:
a stator that comprises a plurality of stator poles arranged around a stator surface of revolution with a stator axis for the stator surface of revolution;
a rotor that comprises a plurality of permanent rotor magnets arranged around a rotor surface of revolution with a rotor axis for the rotor surface of revolution that is substantially coincident with the stator axis and the rotor surface of revolution adjacent the stator surface of revolution;
a drive shaft with a drive shaft axis of rotation that is substantially coincident with the stator axis coupled to the rotor for rotating the rotor relative to the stator about the drive shaft axis of rotation and comprising a lubrication oil channel for receiving lubrication oil that extends from one end of the rotor shaft along the rotor axis; and
at least one axial hydraulic actuator mounted within the rotor coupled to the lubrication oil channel for axially displacing the rotor surface of revolution along the drive shaft relative to the stator surface of revolution in response to lubrication oil pressure to change magnetic flux interaction between the stator poles and the rotor magnets;
wherein at least one of the surfaces of revolution tilts with respect to the drive shaft axis of rotation.

18. The dynamoelectric machine of claim 17, wherein the rotor surface of revolution tilts with respect to the drive shaft axis of rotation.

19. The dynamoelectric machine of claim 17, wherein the stator surface of revolution tilts with respect to the drive shaft axis of rotation.

20. The dynamoelectric machine of claim 17, wherein the both the rotor and the stator surfaces of revolution tilt with respect to the drive shaft axis of rotation.

21. The dynamoelectric machine of claim 17, wherein a plurality of discrete steps approximates at least one of the surfaces of revolution.

22. The dynamoelectric machine of claim 17, wherein the rotor comprises a pair of rotor hubs mounted on opposite sides of a rotor yoke, the rotor hubs mount the rotor magnets and the actuators displace the rotor hubs from the rotor yoke to displace the rotor surface of revolution along the drive shaft relative to the stator surface of revolution.

23. The dynamoelectric machine of claim 17, wherein the rotor comprises a single rotor hub mounted on one side of a rotor yoke, the rotor hub mounts the rotor magnets and the actuators displace the rotor hub from the rotor yoke to displace the surface of revolution along the drive shaft relative to the stator surface of revolution.

24. The dynamoelectric machine of claim 17, wherein the rotor magnets rotate within the stator poles in a conventional machine configuration.

25. The dynamoelectric machine of claim 17, wherein the rotor magnets rotate around the stator poles in an "inside out" machine configuration.

26. The dynamoelectric machine of claim 17, wherein the machine serves as a generator for electrical power and each actuator axially displaces the rotor surface of revolution along the drive shaft relative to the stator surface of revolution in response to the lubrication oil pressure to maintain constant electrical potential of the electrical power.

27. The dynamoelectric machine of claim 17, wherein the machine serves as a generator for electrical power and each actuator axially displaces the rotor surface of revolution along the drive shaft relative to the stator surface of revolution in response to the lubrication oil pressure to reduce the electrical potential of the electrical power upon sensed stator electrical failure.

28. The dynamoelectric machine of claim 17, wherein the machine serves as a motor supplied by electrical power and each actuator axially displaces the rotor surface of revolution along the drive shaft relative to the stator surface of revolution in response to the lubrication oil pressure to control torque and rotational velocity of the motor in response to the electrical power.

29. The dynamoelectric machine of claim 17, wherein the rotor surface of revolution has a tilt relative to the stator surface of rotation to create a magnetic force balance that provides an axial displacement bias of the rotor relative to the stator along the drive shaft axis of rotation.

30. The dynamoelectric machine of claim 17, wherein each hydraulic actuator comprises a generally cylindrical rotor yoke projection from a rotor yoke that mates with a generally cylindrical rotor hub aperture in a rotor hub.

31. The dynamoelectric machine of claim 17, wherein each hydraulic actuator comprises a generally annular rotor yoke projection from a rotor yoke that mates with a generally annular rotor hub aperture in a rotor hub.

32. A dynamoelectric machine that comprises:
a stator that comprises a plurality of stator poles arranged around a stator surface of revolution with a stator axis for the stator surface of revolution;
a rotor that comprises a plurality of permanent rotor magnets mounted on at least one rotor hub mounted to a rotor yoke arranged around a rotor surface of revolution with a rotor axis for the rotor surface of revolution that is substantially coincident with the stator axis and the rotor surface of revolution adjacent the stator surface of revolution;
a drive shaft with a drive shaft axis of rotation that is substantially coincident with the stator axis coupled to the rotor for rotating the rotor relative to the stator about the drive shaft axis of rotation and comprising a lubrication oil channel for receiving lubrication oil that extends from one end of the rotor shaft along the rotor axis; and
at least one axial hydraulic actuator mounted within the rotor comprising a rotor yoke projection mating a rotor hub aperture coupled to the lubrication oil channel for axially displacing the rotor surface of revolution along the drive shaft relative to the stator surface of revolution in response to lubrication oil pressure to change magnetic flux interaction between the stator poles and the rotor magnets;
wherein at least one of the surfaces of revolution tilts with respect to the drive shaft axis of rotation.

33. The dynamoelectric machine of claim 32, wherein each hydraulic actuator comprises a generally cylindrical rotor yoke projection from the rotor yoke that mates with a generally cylindrical rotor hub aperture in the rotor hub.

34. The dynamoelectric machine of claim 32, wherein each hydraulic actuator comprises a generally annular rotor yoke projection from the rotor yoke that mates with a generally annular rotor hub aperture in the rotor hub.

35. A dynamoelectric machine that comprises:

a stator that comprises a plurality of stator poles arranged around a stator surface of revolution with a stator axis for the stator surface of revolution;

at least one rotor that comprises a plurality of permanent rotor magnets arranged around a rotor surface of revolution with a rotor axis for the rotor surface of revolution that is substantially coincident with the stator axis and with the rotor surface of revolution adjacent the stator surface of revolution;

a drive shaft with a drive shaft axis of rotation that is substantially coincident with the stator axis coupled to the rotor for rotating the rotor relative to the stator about the drive shaft axis of rotation; and at least one actuator for axially displacing the rotor surface of revolution along the drive shaft relative to the stator surface of revolution to change magnetic flux interaction between the stator poles and the rotor magnets;

wherein at least one of the surfaces of revolution tilts with respect to the drive shaft axis of rotation and a plurality of discrete steps approximates at least one of the surfaces of revolution.

36. A dynamoelectric machine that comprises:

a stator that comprises a plurality of stator poles arranged around a stator surface of revolution with a stator axis for the stator surface of revolution;

a rotor that comprises a plurality of permanent rotor magnets arranged around a rotor surface of revolution with a rotor axis for the rotor surface of revolution that is substantially coincident with the stator axis and the rotor surface of revolution adjacent the stator surface of revolution;

a drive shaft with a drive shaft axis of rotation that is substantially coincident with the stator axis coupled to the rotor for rotating the rotor relative to the stator about the drive shaft axis of rotation and comprising a lubrication oil channel for receiving lubrication oil that extends from one end of the rotor shaft along the rotor axis; and at least one actuator mounted within the rotor coupled to the lubrication oil channel for axially displacing the rotor surface of revolution along the drive shaft relative to the stator surface of revolution in response to lubrication oil pressure to change magnetic flux interaction between the stator poles and the rotor magnets;

wherein at least one of the surfaces of revolution tilts with respect to the drive shaft axis of rotation and a plurality of discrete steps approximates at least one of the surfaces of revolution.

* * * * *